United States Patent
Spencer et al.

(10) Patent No.: US 6,591,977 B2
(45) Date of Patent: Jul. 15, 2003

(54) CONVEYOR AND PACKAGING APPARATUS AND PACKAGING CONVEYANCE AND PACKAGING METHODS

(75) Inventors: Jack Spencer, Westerville, OH (US); David Sutton, Bonita Springs, FL (US)

(73) Assignee: Norse Dairy Systems, Inc., Columbus, OH (US)

( * ) Notice: Subject to any disclaimer, the term of this patent is extended or adjusted under 35 U.S.C. 154(b) by 0 days.

(21) Appl. No.: 10/291,272

(22) Filed: Nov. 8, 2002

(65) Prior Publication Data

US 2003/0079959 A1 May 1, 2003

Related U.S. Application Data

(62) Division of application No. 09/686,357, filed on Oct. 10, 2000, now Pat. No. 6,478,139.
(60) Provisional application No. 60/162,437, filed on Oct. 28, 1999.

(51) Int. Cl.[7] .............................................. B65G 15/00
(52) U.S. Cl. ................ 198/836.2; 198/836.1; 198/374; 198/375
(58) Field of Search .................... 198/836.2, 836.1, 198/837, 803.3, 803.11, 374, 375

(56) References Cited

U.S. PATENT DOCUMENTS

| | | | | |
|---|---|---|---|---|
| 3,642,112 A | * | 2/1972 | Seragnoli ..................... 198/34 |
| 3,677,389 A | | 7/1972 | Benatar et al. .......... 198/31 AB |
| 3,682,296 A | * | 8/1972 | Buhayar et al. ............. 198/210 |
| 3,709,349 A | * | 1/1973 | Buhayar et al. ............... 198/25 |
| 3,756,452 A | * | 9/1973 | Buhayar et al. ................ 221/1 |
| 3,837,474 A | | 9/1974 | Brooke ........................ 198/240 |
| 3,874,289 A | * | 4/1975 | Valentin ...................... 101/123 |
| 3,915,087 A | * | 10/1975 | Tiemann ...................... 101/115 |
| 3,963,117 A | * | 6/1976 | Nausedas .................... 198/227 |
| 4,192,415 A | | 3/1980 | Krener et al. ................ 198/374 |
| 4,491,214 A | * | 1/1985 | Malivoir et al. ............ 198/374 |
| 4,498,573 A | | 2/1985 | Anderson et al. ........... 198/374 |
| 4,555,892 A | * | 12/1985 | Dijkman ....................... 53/142 |
| 4,648,502 A | * | 3/1987 | Smith et al. ................. 198/399 |
| 4,883,162 A | | 11/1989 | Flot ........................... 198/374 |
| 5,145,049 A | | 9/1992 | McClurkin ................... 198/374 |
| 5,176,154 A | | 1/1993 | Sagawa et al. ............. 131/282 |
| 5,197,845 A | * | 3/1993 | Snead ........................ 414/339 |
| 5,275,395 A | * | 1/1994 | Boggiano et al. ........... 271/259 |
| 5,297,667 A | * | 3/1994 | Hoffman et al. ............ 198/493 |
| 5,467,864 A | | 11/1995 | McCoy et al. .............. 198/409 |
| 5,630,496 A | | 5/1997 | Mims ......................... 198/374 |
| 5,676,238 A | * | 10/1997 | Saastamo .................. 198/502.2 |
| 5,899,315 A | | 5/1999 | Mercer et al. .............. 198/374 |
| 6,032,782 A | | 3/2000 | Sampson ..................... 198/374 |
| 6,126,383 A | | 10/2000 | Franklin et al. ............. 414/792 |
| 6,478,139 B1 | * | 11/2002 | Spencer et al. ............. 198/374 |

\* cited by examiner

*Primary Examiner*—Christopher P. Ellis
*Assistant Examiner*—Rashmi Sharma
(74) *Attorney, Agent, or Firm*—Standley & Gilcrest LLP

(57) ABSTRACT

The present invention relates to a conveyor and packaging apparatus, as well as packaging conveyance and packaging methods for irregularly shaped articles and packages, such as for packaged food products as in the case of conical packages for ice cream confections and the like. In the present invention, pairs of manufactured articles having irregular profiles are moved along a conveyor system. Each of a given pair of articles moves along an independent conveyor path toward a predetermined destination. Each article may undergo a change in alignment along its path such that it is in a preferred orientation upon leaving the conveyor system. In a preferred embodiment, pairs of conical articles are oriented with the narrow ends in opposing directions (interlaced) upon leaving the system so as to minimize the amount of space required for packaging of the two articles when placed adjacent one another.

5 Claims, 7 Drawing Sheets

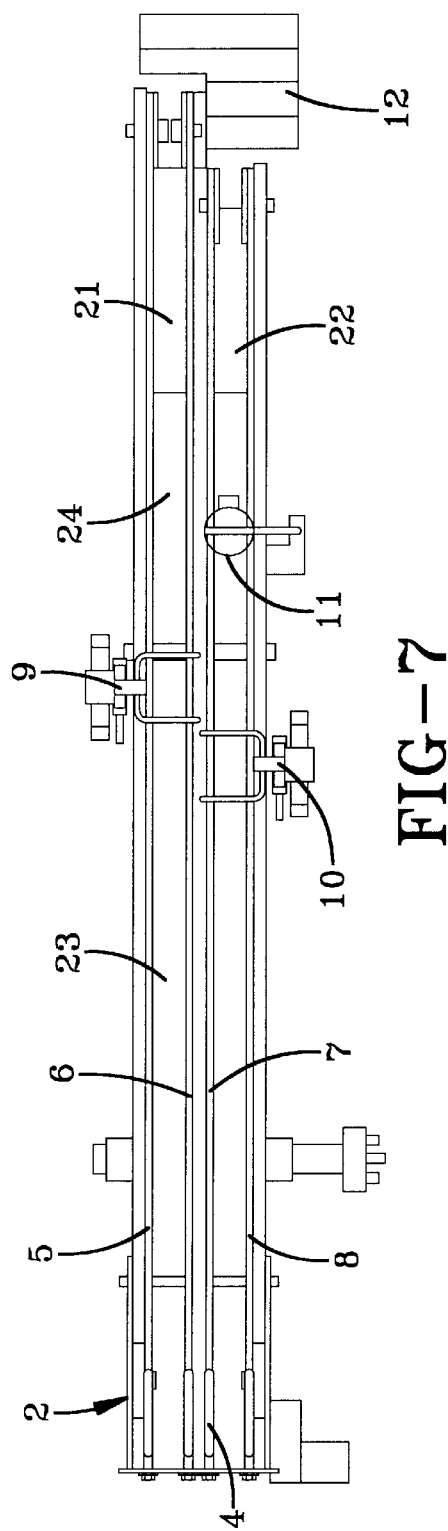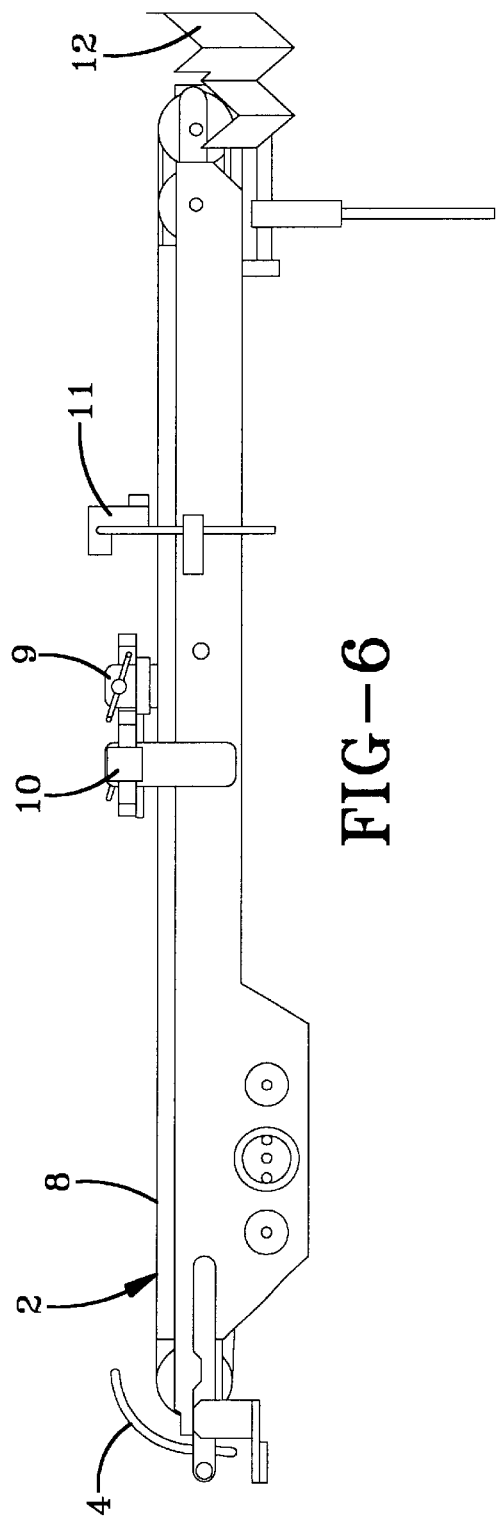

US 6,591,977 B2

CONVEYOR AND PACKAGING APPARATUS AND PACKAGING CONVEYANCE AND PACKAGING METHODS

This application claims the benefit of provisional application Serial No. 60/162,437 filed Oct. 28, 1999, incorporated herein by reference and is a division of utility application Ser. No. 09/686,357 filed Oct. 10, 2000, now U.S. Pat. No. 6,478,139, incorporated herein by reference.

TECHNICAL FIELD OF THE INVENTION

The present invention is in the field of conveyance and packaging and apparatus and methods.

BACKGROUND OF THE INVENTION

The present invention relates to a conveyor and packaging apparatus, as well as packaging conveyance and packaging methods for irregularly shaped articles and packages, such as for packaged food products as in the case of conical packages for ice cream confections and the like.

Irregularly shaped articles and packages present several problems in conveyance and packaging in an industrial setting.

These articles are typically unbalanced and difficult to handle either by workers or by machinery.

Their weight imbalance makes it difficult to design conveyance and packaging systems because the articles are not well suited to standard conveyance and packaging designs and protocols. Also, their irregular shape makes it more difficult for human hands or machinery to grasp them and repetitively, reliably, and safely transport them.

With specific regard to conical objects, these objects have the disadvantage of having relatively little surface area upon which to apply a static or kinetic force to the center of gravity in order to move the object in a balanced way without the object turning on its side or otherwise precessing about its weight center. Accordingly, it is difficult to convey conical objects using standard conveyor belts as they tend to cause the conical objects to roll out of a regular alignment. It is also difficult to package conical objects due to their irregular shape and weight distribution that leads to excluded volumes and product settling that are difficult to accommodate particularly in packaging large numbers of objects in a single container.

With specific regard to frozen ice cream confections, these problems are multiplied by the need to move the package quickly and securely without undue force being applied to the package. Relatively rapid and safe movement is necessary to place the frozen confection in a package without allowing the product to warm, and without bringing to bear forces that might damage the confection shell or its contents.

Although described in terms of an apparatus and method for use with conical ice cream confection products, advantages in other applications may become apparent from the present disclosure or through practice of the invention.

SUMMARY OF THE INVENTION

The present invention includes an apparatus and methods for conveying and packaging irregularly shaped articles or packages.

Preferred embodiments of the present invention overcome some or all of the above problems.

In broadest terms, the present invention includes a conveyor system for conveying and aligning pairs of articles having a relatively wide portion and a relatively narrow portion, the conveyor comprising: (a) a pair of substantially parallel conveyors comprising: (1) a first conveyor comprising first dual conveyor bands adapted to engage the relatively wide portion of the first of the articles so as to convey the first of the articles in a forward direction while allowing the relatively narrow portion of the first of the articles to swingably extend therebetween, and a first ramp portion disposed below the first dual conveyor bands and adapted to engage the relatively narrow portion of the first of the articles so that it swings opposite the forward direction as the first of the articles is being conveyed; (2) a second conveyor comprising second dual conveyor bands adapted to engage the relatively wide portion of the second of the articles so as to convey the second of the articles in a forward direction while allowing the relatively narrow portion of the second of the articles to swingably extend therebetween, and a second ramp portion disposed below the second dual conveyor bands and adapted to engage the relatively narrow portion of the second of the articles so that it swings in the forward direction as the first of the articles is being conveyed; and (b) a toggling mechanism adjacent the second conveyor that engages the relatively wide portion of the second article so as to cause the relatively narrow portion of the second of the articles to swing in the forward direction prior to engaging the second ramp portion.

It is preferred that each the first and second conveyor move at substantially equal rates, and that each first and second conveyor additionally comprise a registration and release mechanism that engages the respective first and second articles and releases them in a timed sequence, such that the second article is released in advance of the first article. The conveyor may also include a slide at the terminal end of the conveyor adapted to deposit the aligned pairs of articles onto a conveyor.

The invention also includes a conveyor adapted to contain the aligned pairs of articles, such as a plurality of interlaced conical objects, the conveyor comprising:

a conveyor having a longitudinal axis and adapted to transport a plurality of conical objects in a series, the conical objects being in an interlaced arrangement with opposing narrow ends of the cones aligned toward one another; and (b) a stabilizer bar positioned substantially perpendicular to the longitudinal axis and over the conveyor so as to engage the conical objects so as to resist the conical objects from rolling while in the interlaced arrangement.

The present invention also includes a method of conveying and aligning pairs of articles having a relatively wide portion and a relatively narrow portion, the conveyor comprising: (a) providing a pair of substantially parallel conveyors comprising: (1) a first conveyor comprising first dual conveyor bands adapted to engage the relatively wide portion of the first of the articles so as to convey the first of the articles in a forward direction while allowing the relatively narrow portion of the first of the articles to swingably extend therebetween, and a first ramp portion disposed below the dual conveyor bands and adapted to engage the relatively narrow portion of the first of the articles so that it swings opposite the forward direction as the first of the articles is being conveyed; (2) a second conveyor comprising second dual conveyor bands adapted to engage the relatively wide portion of the second of the articles so as to convey a second of the articles in a forward direction while allowing the relatively narrow portion of the second of the articles to swingably extend therebetween, and a second ramp portion disposed below the second dual conveyor bands and adapted to engage the relatively narrow portion of the second of the articles so that it swings in the forward direction as the second of the articles is being conveyed; and (3) a toggling mechanism adjacent the second conveyor and that engages the relatively wide portion of the second article so as to cause the relatively narrow portion of the second of the articles to swing in the forward direction prior to engaging the second ramp portion; and (b) advancing the first and second conveyor so as to cause the first and second articles to align aside one another such that the narrow portion of the first article is adjacent the wide portion of the second article.

It is preferred that the method be carried out on conical articles, such as conical ice cream confections in paper packages.

It is also preferred that the method further comprise maintaining the first and second articles aligned aside one another while placing the first and second articles into a container.

The invention also includes, independently, a conveyor for interlaced conical objects, the conveyor comprising: (a) a conveyor having a longitudinal axis and adapted to transport a plurality of conical objects in a series, the conical objects being in an interlaced arrangement with opposing narrow ends of the cones aligned toward one another; and (b) a stabilizer bar positioned substantially perpendicular to the longitudinal axis and over the conveyor so as to engage the conical objects so as to resist the conical objects from rolling while in the interlaced arrangement.

Also included in the present invention is, in broadest terms, a conveyor system for conveying and aligning pairs of articles having a relatively wide portion and a relatively narrow portion, the conveyor comprising: (1) a pair of substantially parallel conveyors comprising: (a) a first conveyor adapted convey the first of the articles in a forward direction, the article oriented on the first conveyor so as to have its relatively wide portion in the forward direction; (b) a second conveyor comprising dual conveyor bands adapted to engage the relatively wide portion of the second of the articles so as to convey the second of the articles in a forward direction while allowing the relatively narrow portion of the second of the articles to swingably extend therebetween, and a first ramp portion disposed below the dual conveyor bands and adapted to engage the relatively narrow portion of the second of the articles so that it swings in the forward direction as the first of the articles is being conveyed; and (c) a toggling mechanism adjacent the second conveyor that engages the relatively wide portion of the second article so as to cause the relatively narrow portion of the second of the articles to swing in the forward direction prior to engaging the second ramp portion.

The conveyor may have both the first and second conveyor move at substantially equal rates. The first and second conveyors may each additionally comprise a registration and release mechanism that engages respective first and second articles and releases them in a timed sequence, such that the second article is released in advance of the first article. The conveyor may have a slide at the terminal end of the conveyor adapted to deposit the aligned pairs of articles onto a conveyor, the conveyor preferably adapted to contain said aligned pairs of articles.

BRIEF DESCRIPTION OF THE DRAWINGS

FIG. 6 is a side view of a first conveyor apparatus that may be used in accordance with one embodiment of the present invention.

FIG. 7 is a top view of a first conveyor apparatus that may be used in accordance with one embodiment of the present invention.

DETAILED DESCRIPTION OF THE PREFERRED EMBODIMENTS

In accordance with the foregoing summary, the following presents a detailed description of the preferred embodiment of the invention that is currently considered to be the best mode.

In the present invention, pairs of manufactured articles having irregular profiles (particularly those with non-rectilinear dimensions, such as those having a relatively narrow end and a relatively wider end, such as conical objets or those with trapezoidal shapes) are moved along a conveyor system for purposes of packaging alignment and conveyance. Each of a given pair of articles moves along an independent conveyor path toward a predetermined destination. Each article may undergo a change in alignment along its path such that it is in a desired orientation upon leaving the conveyor system. In a preferred embodiment, pairs of conical articles are oriented with the narrow ends in opposing directions (interlaced) upon leaving the system so as to minimize the amount of space required for packaging of the two articles when placed adjacent one another.

Figure 1:
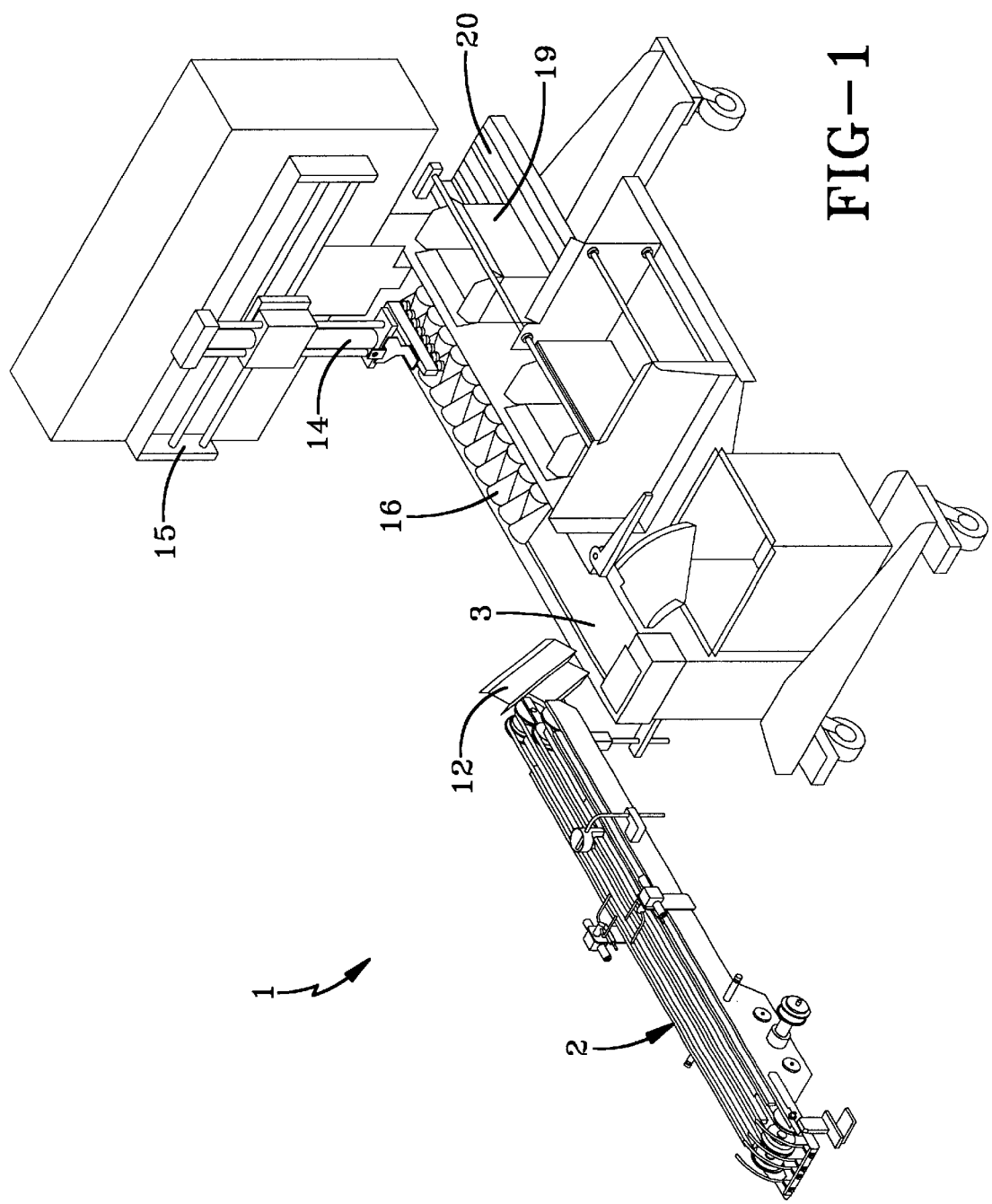
FIG. 1 is a perspective view of a conveyor system that may be used in accordance with one embodiment of the present invention.

FIG. 1 is a perspective view of a conveyor system that may be used in accordance with one embodiment of the present invention. FIG. 1 shows a conveyor system 1 with a first conveyor apparatus 2 and a second conveyor apparatus 3. The conveyors allow the articles to be supported and regularly advanced without undue grasping force being applied. The articles are also held so as to be capable of swinging freely along a portion of the conveyor path to be able to have their orientation changed as they travel along the conveyor.

Pairs of manufactured articles 16 are placed initially at the starting end of the first conveyor apparatus 2. The articles 16 undergo a change in orientation while passing along the first conveyor apparatus 2 and then pass down a dual-chute slide 12 onto the second conveyor apparatus 3. The articles 16, in the preferred orientation, pass along the second conveyor apparatus 3 until they reach the terminal end of the conveyor, where they may be lifted off the second conveyor apparatus 3 in any appropriate number by an article lifting arm 14 and then moved in a substantially horizontal direction by a horizontal rail device 15 to a location substantially above the product packaging 19. The lifting arm 14 may then lower the articles 16 into the product packaging 19, which may then be taken off the packaging conveyor 20 of the system 1 for sealing and shipping.

Figure 2:
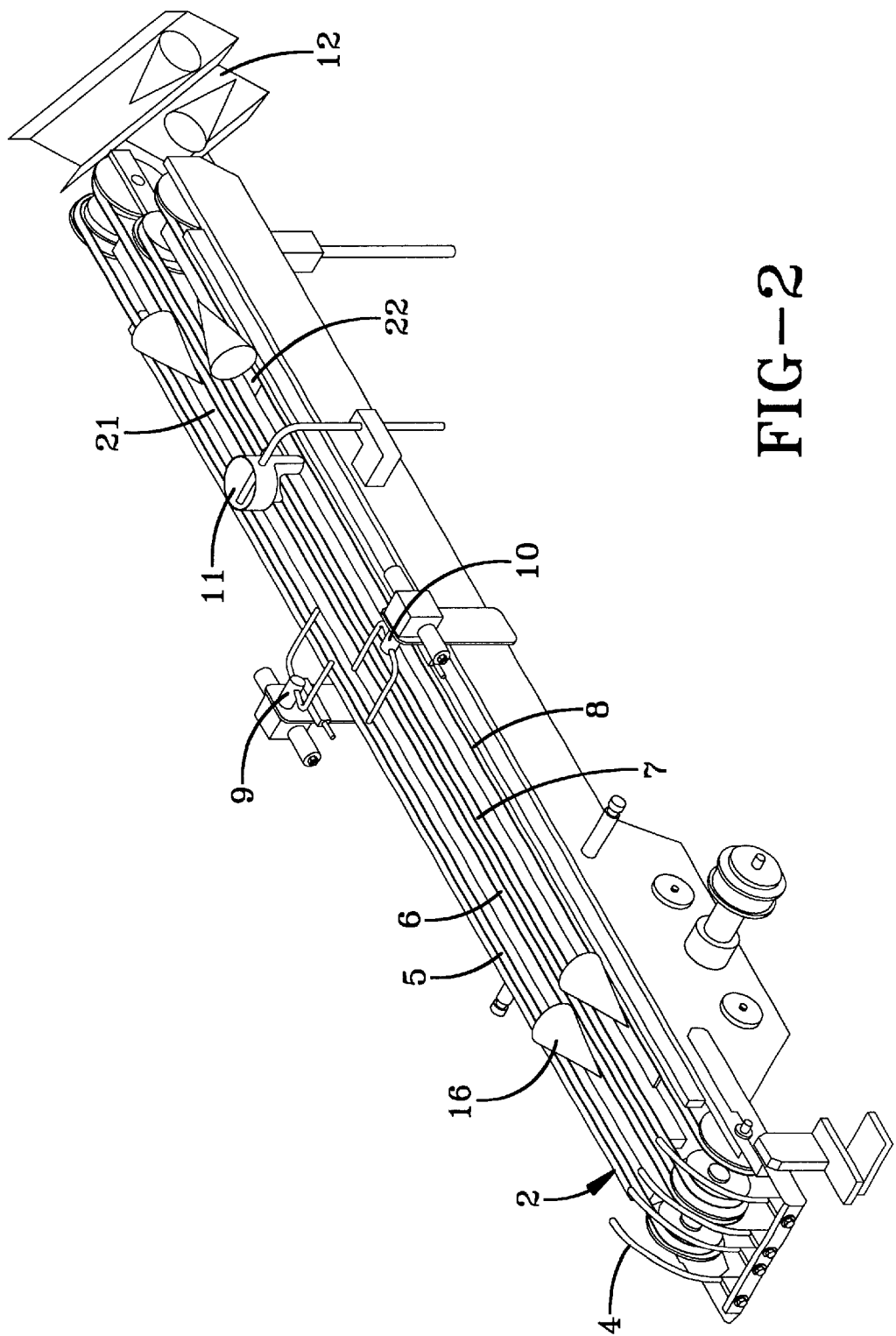
FIG. 2 is a perspective view of a first conveyor apparatus that may be used in accordance with one embodiment of the present invention.

FIG. 2 shows a perspective view of the first conveyor apparatus 2. The articles of manufacture 16 are fed onto the first conveyor apparatus 2 guided by an alignment structure 4. A first article 16 of a pair is guided by the alignment structure 4 onto a first pair of dual conveyor bands 5 and 6, and the second article passes through the alignment structure 4 onto a second pair of dual conveyor bands 7 and 8. The conveyor may be powered by any appropriate drive mechanism, such as an electric motor, as is known and used in the art. The conveyor of the present invention may be used in accordance with other manufacturing and packaging equipment that may be adapted to supply the articles to the conveyor of the present invention. For instance, in the case of ice cream confections, the alignment structure 4 typically guides the conical articles onto the conveyor from the filling and packaging machinery (not shown) that fills the cones with ice cream and/or toppings and provides a cover or the paper cone wrapping. Filling and packaging equipment of this type is commercially available from Norse Dairy Systems of Columbus, Ohio.

In a preferred embodiment, conical articles are placed on bands that are a spaced apart by a distance less than the maximum width of the cone at its base. This width allows the conical article 16 to suspend from the bands with its narrow end pointing downward. The pair of articles then moves along the first conveyor apparatus 2 in a forward direction until the first and second articles are stopped by a first register and release mechanism 9 and a second register and release mechanism 10, respectively. The mechanisms release the pairs along the conveyor at predetermined intervals so as to maximize packaging efficiency but minimize overcrowding of the conveyor system. The area of the conveyor system under the articles may be sufficiently close to the bands such that the narrow end of an article swings in a backward direction and the articles proceed down the conveyor with the wide end of the articles in the forward direction.

As the pairs pass forward along the first conveyor apparatus 2, preferably at sufficiently equivalent speeds, the bottom of the conveyor apparatus preferably lowers such that the articles are allowed to swing freely after passing the register and release mechanisms. The first article then engages a first ramp 21 along its path, causing the first article to swing with its narrow end pointing in a backward direction (i.e., opposite the direction of travel of the conveyor). The bottom of the first conveyor apparatus 2 is higher at the end of the first 21 ramp such that the first article proceeds down the first conveyor apparatus with its narrow end maintained in the backward direction. The second article is engaged by a toggling mechanism 11 located adjacent the second dual conveyor bands 7 and 8. The toggling mechanism 11 engages the relatively larger portion of the conical second article so as to cause the article to swing with its narrow portion toward the forward direction so as to allow the second article to engage a second ramp 22 along its path. The second ramp 22 is sufficiently close to the toggling mechanism 11 so that the second article engages the second ramp 22 with its narrow end directed toward the forward direction. The floor of the first conveyor apparatus 2 is higher at the end of the second ramp 22 such that the second article progresses down the first conveyor apparatus 2 with its narrow end maintained in the forward direction. When the articles reach the terminal end of the first conveyor apparatus 2, they pass into optional dual-chute slide 12 and proceed down onto the second conveyor apparatus. It will be appreciated that other conveyor arrangements may be used downstream of the interlacing conveyor of the present invention.

FIG. 6 shows a side view of the first conveyor apparatus. In the top view shown in FIG. 7, the initial higher level of the conveyor floor 23 is shown to drop off to a lower level 24 near the position of the register and release mechanisms 9 and 10. As articles progress along the first conveyor apparatus 2, they will encounter the first and second ramps, 21 and 22 respectively, which will then guide the articles down the remainder of the first conveyor apparatus 2 in their preferred orientation as described previously.

Figure 3:
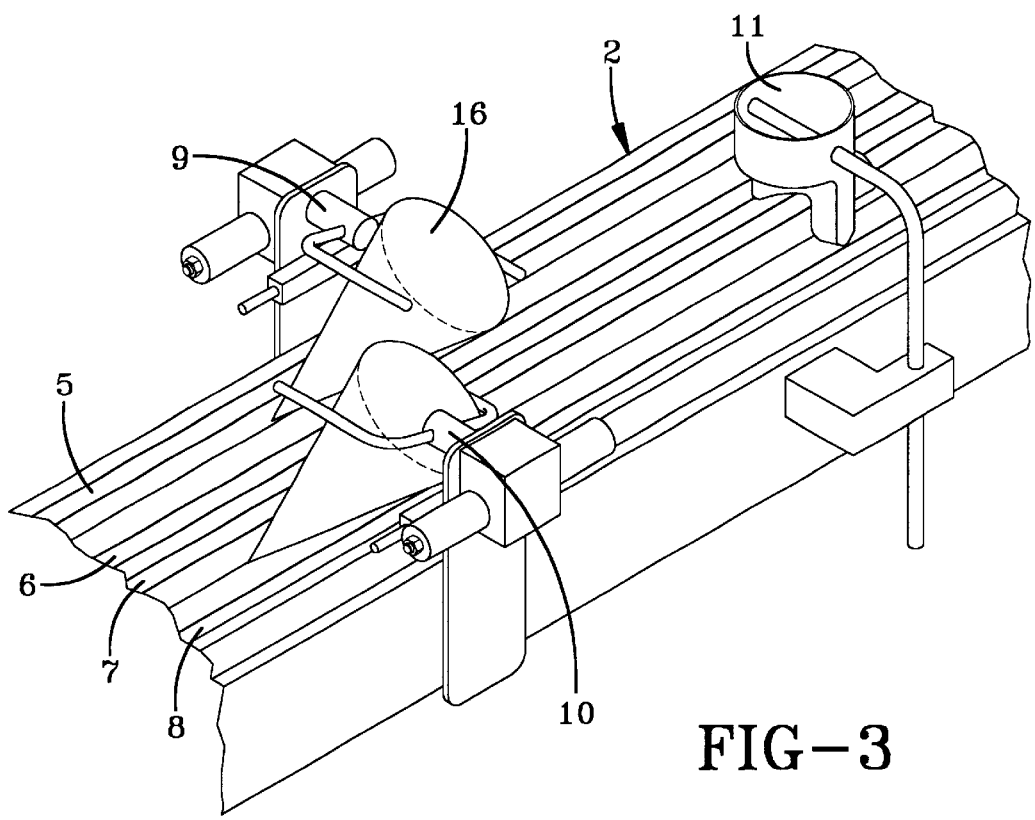
FIG. 3 is another perspective view of a first conveyor apparatus that may be used in accordance with one embodiment of the present invention.

FIG. 3 shows a closer perspective view of the first conveyor apparatus 2 with the articles 16 being detained temporarily by the first and second register and release mechanisms, 9 and 10 respectively. The register and release mechanisms 9 and 10 may be of the type that operates through the use of electric eyes to establish that articles are in position to be released by the respective register and release mechanism.

Figure 4:
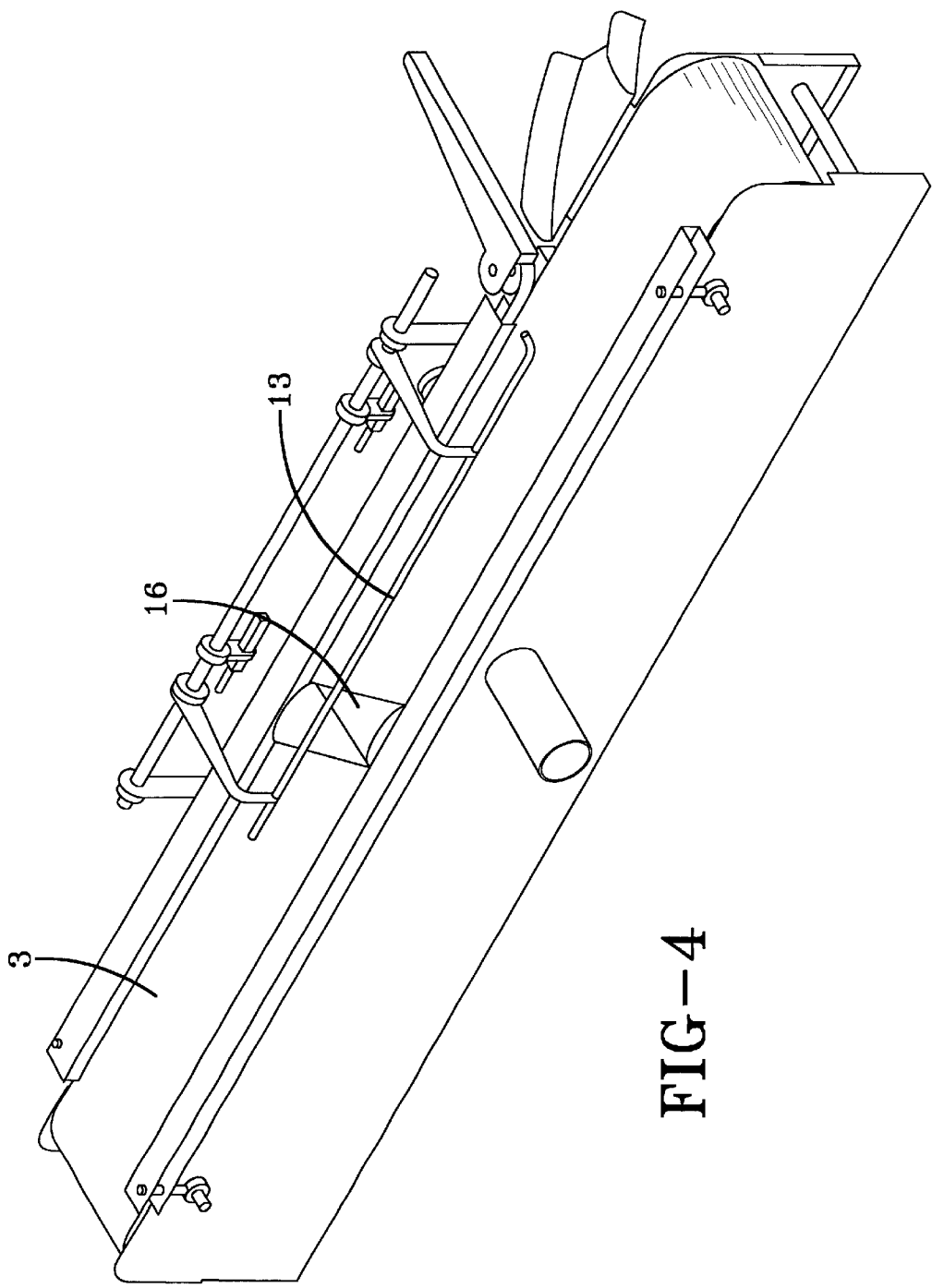
FIG. 4 is a perspective view of a second conveyor apparatus that may be used in accordance with one embodiment of the present invention.
Figure 8:
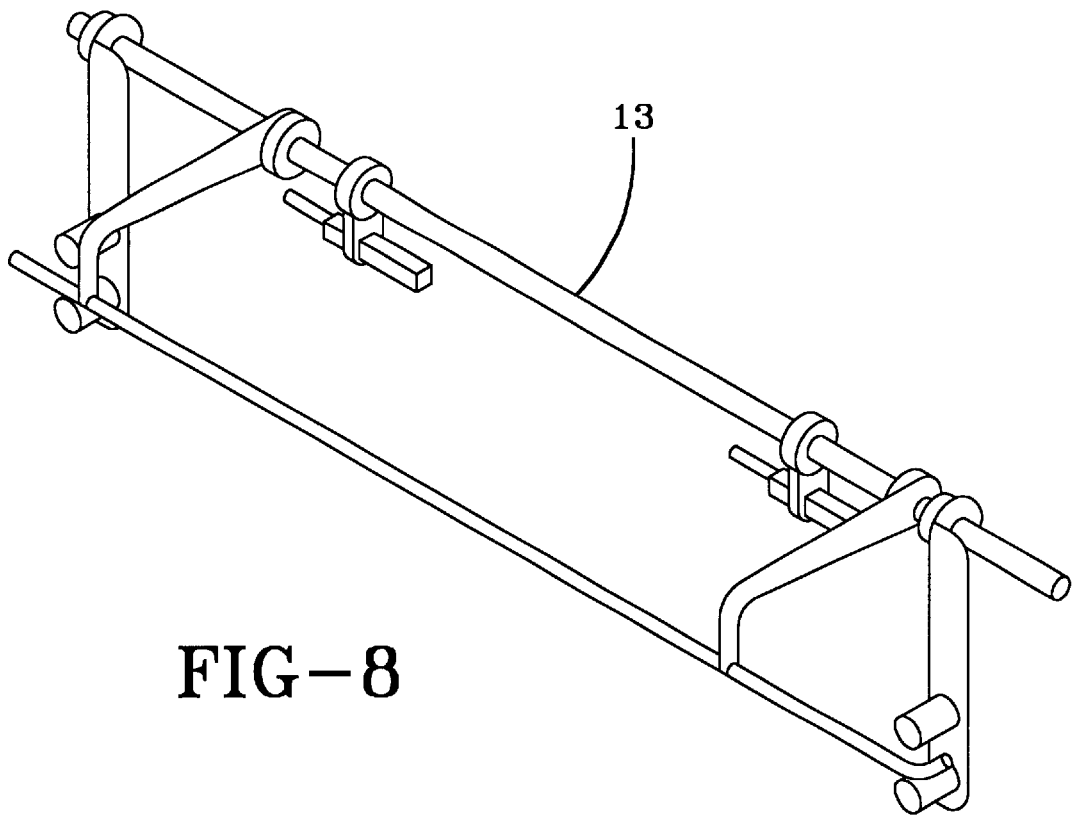
FIG. 8 is a perspective view of a stabilizing bar that may be used in accordance with one embodiment of the present invention.

FIG. 4 shows a perspective view of the second conveyor apparatus 3. The articles 16 move in a forward direction along the second conveyor apparatus 3. A stabilizing bar 13 located longitudinally above the center of the second conveyor prevents the conical articles from rolling significantly, thereby maintaining the major axes of the articles sufficiently perpendicular to the forward, longitudinal direction of the conveyor. FIG. 8 shows a closer perspective view of the stabilizer bar 13.

Figure 5:
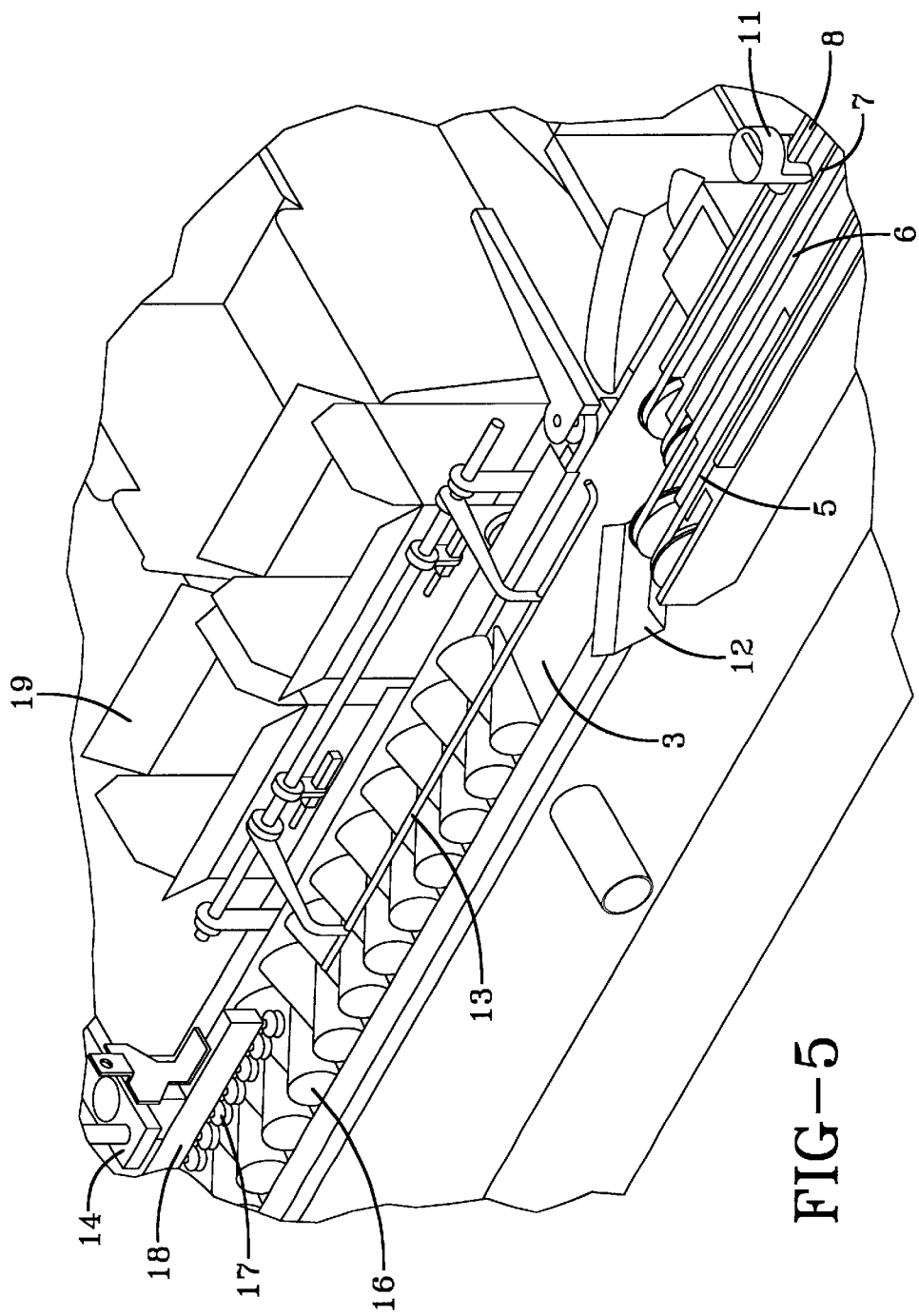
FIG. 5 is another perspective view of a conveyor system that may be used in accordance with one embodiment of the present invention.

FIG. 5 shows a perspective view of the first conveyor apparatus 2 and second conveyor apparatus 3. As the articles 16 reach the terminal end of the second conveyor apparatus 3, they remain there until a sufficient number of articles have accumulated. Once a sufficient number of articles accumulate, a lifting mechanism 18 containing rubber vacuum nozzles 17 is lowered into contact with the articles. The articles 16, having a sufficient vacuum seal created with the rubber vacuum nozzles 17, may then be lifted off the second conveyor apparatus 3 by the lifting arm 14 and placed into the desired packaging container 19.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, it will be within the ability of one of ordinary skill in the art to make alterations or modifications to the present invention, such as through the substitution of equivalent materials or structural arrangements, or through the use of equivalent process steps, so as to be able to practice the invention without departing from its spirit as reflected in the appended claims, the text and teaching of which are hereby incorporated by reference herein. It is the intention, therefore, to limit the invention only as indicated by the scope of the claims and equivalents thereof.

What is claimed is:

1. A conveyor for interlaced conical objects, said conveyor comprising:
    (a) a conveyor having a longitudinal axis and adapted to transport a plurality of conical objects in a series, said conical objects being in an interlaced arrangement with opposing narrow ends of said cones aligned toward one another; and
    (b) a stabilizer bar positioned substantially parallel to said longitudinal axis and over said conveyor so as to engage said conical objects so as to prevent said conical objects from displacement from said interlaced arrangement while under said stabilizer bar.

2. The conveyor for interlaced conical objects according to claim 1 wherein said stabilizer bar has at least one flared end.

3. The conveyor for interlaced conical objects according to claim 1, further comprising a slide at one end of said conveyor.

4. A method for transporting conical objects in an interlaced arrangement, said method comprising the steps of:

provided a plurality of conical objects, said conical objects in an interlaced arrangement with one another;

conveying said plurality of conical objects along a path, said path having a longitudinal axis and adapted to transport a plurality of conical objects; and maintaining said conical objects in said interlaced arrangement with a stabilizer bar, said stabilizer bar positioned substantially parallel to said longitudinal axis and above said path so as to prevent said conical objects from displacement from said interlaced arrangement.

5. A method for maintaining a plurality of conical objects in an interlaced arrangement while transporting said plurality of conical objects from a first location to a second location, said method comprising the steps of:

transporting a plurality of conical objects in an interlaced arrangement on a conveyor; and placing a stabilizer bar above said conveyor so as to prevent said conical objects from displacement from said interlaced arrangement during transport from said first location to said second location.

* * * * *